(12) United States Patent
Takano (10) Patent No.: US 6,218,638 B1
(45) Date of Patent: *Apr. 17, 2001

(54) METHOD FOR INSPECTING THE QUALITY IN RESISTANCE WELDING

(75) Inventor: Yukinori Takano, Shizuoka (JP)

(73) Assignee: Yazaki Corporation, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 09/096,476

(22) Filed: Jun. 12, 1998

(30) Foreign Application Priority Data

Jun. 12, 1997 (JP) .................................................... 9-155247

(51) Int. Cl.[7] .................................................. B23K 11/25
(52) U.S. Cl. ..................... 219/110; 219/56.22; 219/117.1
(58) Field of Search .................... 219/56, 56.1, 56.21, 219/56.22, 58, 78.16, 91.1, 91.2, 91.23, 108, 109, 110, 117.1

(56) References Cited

FOREIGN PATENT DOCUMENTS

| | | |
|---|---|---|
| 58-176085 | 10/1983 | (JP) . |
| 62-18273 | 4/1987 | (JP) . |
| 63-123578 | 5/1988 | (JP) . |
| 63-137586 | 6/1988 | (JP) . |
| 1-57989 | 3/1989 | (JP) . |
| 1-215475 | 8/1989 | (JP) . |
| 1-278973 | 11/1989 | (JP) . |
| 2-220785 | 9/1990 | (JP) . |
| 3-8585 | 1/1991 | (JP) . |

*Primary Examiner*—Gregory Mills
(74) *Attorney, Agent, or Firm*—Morgan, Lewis & Bockius LLP (57) ABSTRACT

A method for inspecting the quality of the resistance weld, in which the adhesive force between twisted wires, as materials to be welded in a welding portion, can be predicted on the basis of the inter-tip resistance between electrodes, so that the quality of the weld can be evaluated accurately. The method comprises the steps of: measuring a welding width of the welding portion; calculating a reference welding height of the welding portion from the measured welding width on the basis of a predetermined reference welding sectional area of the welding portion; passing the welding current through the welding portion until the height of the welding portion reaches the calculated reference welding height; and inspecting the state of welding of the twisted wires on the basis of a bottom value of inter-tip resistance of the pair of electrodes in an initial stage of conduction of the welding current.

21 Claims, 9 Drawing Sheets

INTER-TIP RESISTANCE DIFFERENCE OF 30-15 CYCLES

FIG. 6 (b)

ADHESIVE FORCE AND DIFFERENCE OF INTER-TIP RESISTANCE

METHOD FOR INSPECTING THE QUALITY IN RESISTANCE WELDING

The present invention relates to a method for inspecting the quality of a resistance weld formed, for example, when a strand composed of twisted copper wires of one electric cable and a strand composed of twisted copper wires of the other electric cable are put on one another and pressed between a pair of electrodes, and a large current is passed through the strands for a short time to utilize resistance heating caused by the current conduction to thereby perform resistance welding.

BACKGROUND OF THE INVENTION

Figure 8:
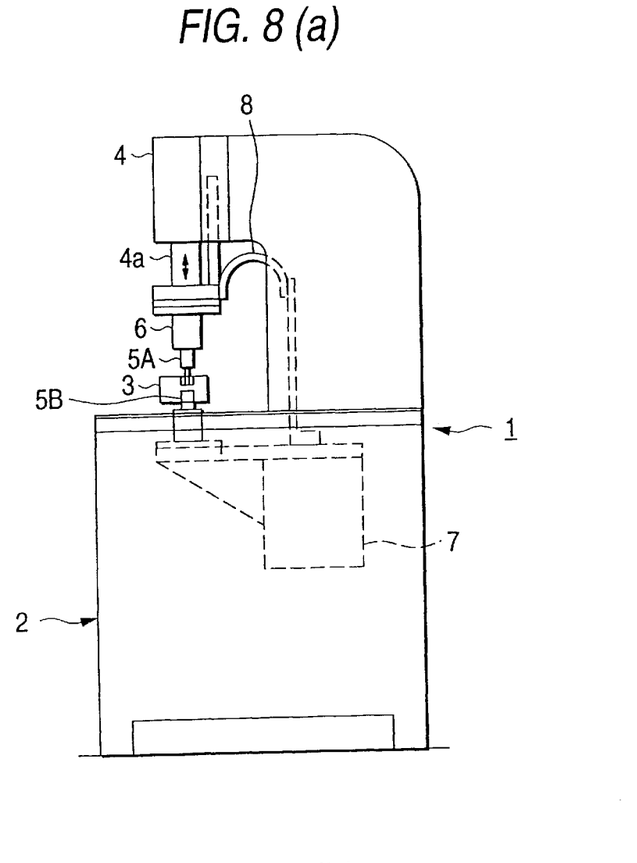
FIG. 8(a) is a side view of a conventional resistance welding apparatus.
FIG. 8(b) is a view of a main part of the conventional resistance welding apparatus.
Figure 9:
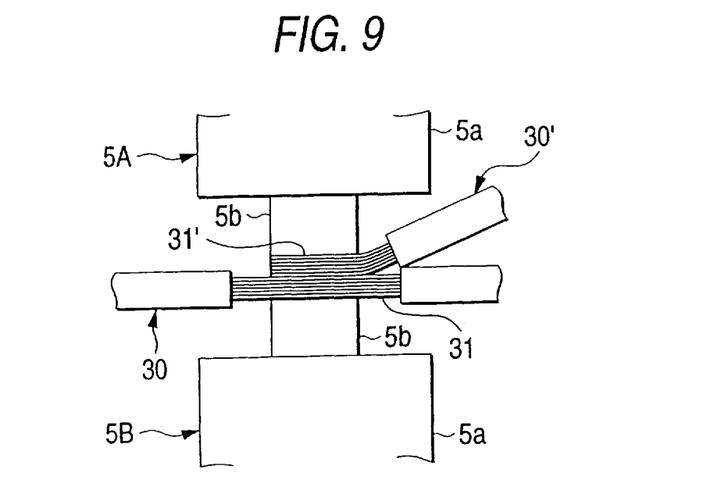
FIG. 9 is a view of the case where the strands of the pair of cables are welded between the pair of electrodes in the conventional resistance welding apparatus.

A conventional resistance welding apparatus for welding the strands composed of twisted copper wires of a pair of electric cables, for example, comprises an apparatus using an AC thyristor system (a system in which thyristors are used as electric source switches for performing welding current regulation continuously by changing the firing phase of the thyristors) as shown in FIG. 8(a). The resistance welding apparatus 1 is designed to perform resistance welding on a stack of strands 31 and 31' composed of twisted copper wires of a pair of electrically insulating coated electric cables 30 and 30' (hereinafter simply referred to as "cables") as illustrated in FIG. 9. The resistance welding apparatus 1 has a box-like apparatus body 2 which is substantially U-shaped in side view. A cable-setting jig 3 is disposed in the center of the apparatus body 2. An air cylinder 4 is attached to the upper front of the apparatus body 2. A pair of upper and lower electrodes 5A and 5B pass a welding current therebetween and are provided below the air cylinder 4, and the cable-setting jig 3 respectively. These thus serves to pass the current through a welding portion of the strands 31 and 31' and also serve to apply a predetermined amount of pressure to the welding portion.

The upper electrode 5A is connected to a piston rod 4a of the air cylinder 4 through an electrode holder 6 so as to move vertically. Further, the upper electrode 5A is also connected, through an ounce copper plate 8, to a welding transformer (electric source) 7, which serves to supply a welding current. Further, the lower electrode 5B is fixed to the center portion of the apparatus body 2 and is connected to the welding transformer 7. As shown in FIG. 8(b), the welding transformer 7 is connected to a welding timer 9, which serves to set the current value and current-conduction time of the welding current. An electromagnetic valve 4A of the air cylinder 4 is opened/closed on the basis of conduction-start and conduction-end signals obtained from the welding timer 9. As shown in FIG. 9, each of the electrodes 5A and 5B is constituted by a columnar chromium-copper matter 5a and a rectangular tungsten tip 5b.

Figure 10:
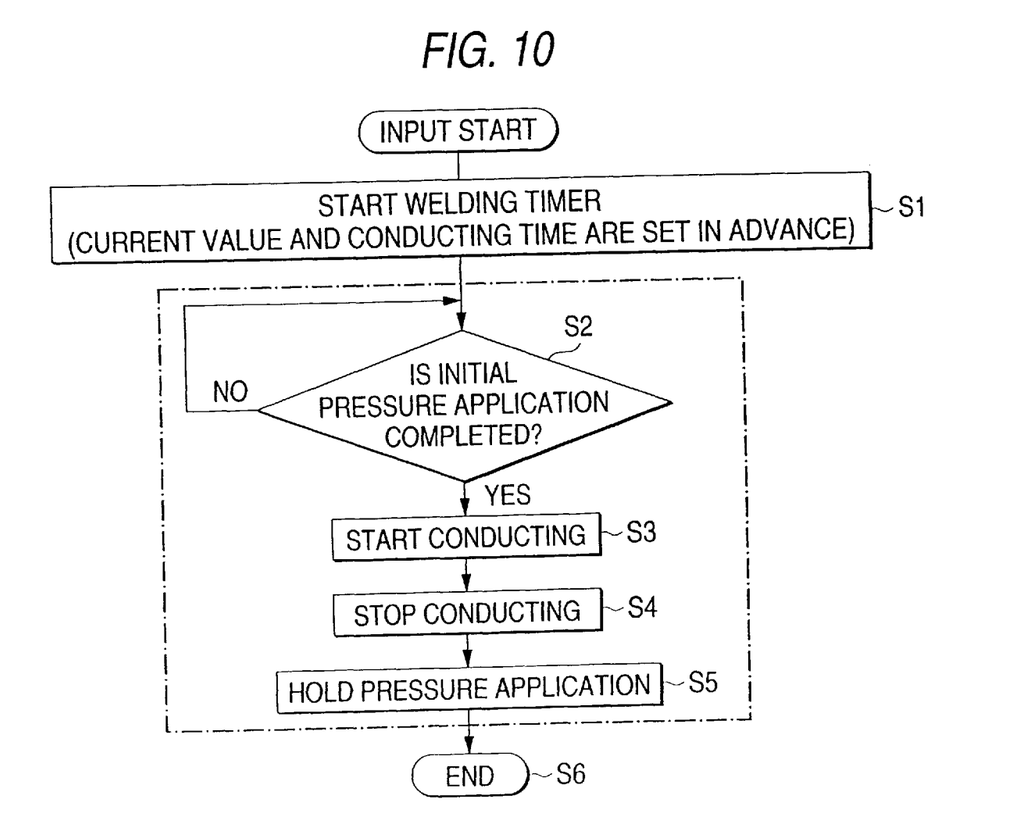
FIG. 10 is a flow chart for the resistance welding of the strands of the pair of cables in the conventional resistance welding apparatus.

The step of performing resistance welding of the overlapping strands 31 and 31' of the pair of cables 30 and 30', by means of the AC thyristor system resistance welding apparatus 1 as shown in FIG. 9, will be described with reference to a flow chart shown in FIG. 10. First, after the exposed strands 31 and 31' of the pair of cables 30 and 30' are put in between the pair of electrodes 5A and 5B through the cable-setting jig 3, a start input switch 9A is turned on so that the welding timer 9 starts (step S1). As a result, the electromagnetic valve 4A, that is connected to a (not-shown) compression air source, is opened and the upper electrode 5A is moved down by the air cylinder 4. After completion of initial pressure application to the strands 31 and 31' between the pair of electrodes 5A and 5B (step S2), a welding current is passed between the pair of electrodes 5A and 5B alternately upward and downward by the welding transformer 7 (step S3). The welding current is passed for the current-conduction time which is set (fixed) in advance. Resistance heating caused by the conduction of the welding current is utilized so that the strands 31 and 31' are subjected to thermo-compression bonding. After resistance welding, the current conduction is stopped (step S4). Then, cooling is performed while the pressure application state between the pair of electrodes 5A and 5B is held for a predetermined time (step S5). The operation for the steps S2 to S5 is carried out automatically under the sequence control of the welding timer 9. Then, when the pressurized state is canceled, the resistance welding is completed (step S6). Such technique is disclosed in Japanese Patent Unexamined Publication Nos. Hei-1-278973 and Hei-5-329661.

Figure 11:
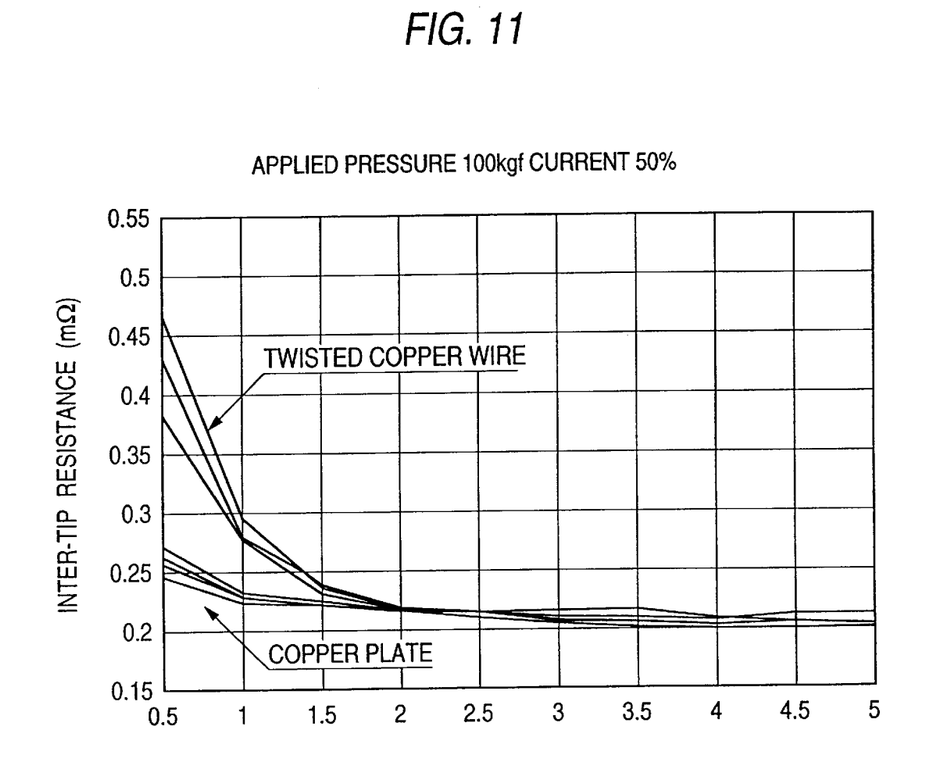
FIG. 11 is a graph for comparison between the value of the inter-tip resistance in the case where the subject of welding is strands of twisted copper wires and the value of the inter-tip resistance in the case where the subject of welding is copper plates.

The inter-tip resistance (calculated on the basis of an inter-tip voltage value and a current value under current conduction) between the pair of electrodes 5A and 5B, which shows a correlation with the adhesive force, is used in a non-destructive inspection method for inspecting the characteristics of the weld, such as the welding strength (inter-wire adhesive force), or the like, that bond the twisted copper wires in strands 31 and 31'. As shown in FIG. 11, in the case where the twisted copper wire in strands 31 and 31' are welded, these are two noteable effects. First, the inter-tip resistance value in an initial stage of current conduction (up to about 2 cycles in the case of an AC system) is high compared with that in copper plates, or the like, because a space is generated between the strands 31 and 31'. Second, variations occur in contact resistance because the state of the alignment of the strands 31 and 31' is not uniform. Accordingly, when the inter-tip resistance is measured during the entire period of current conduction and averaged to evaluate the state of the weld, the inter-tip resistance is greatly affected by the contact resistance between the strands 31 and 31' in the initial stage of current conduction. As a result, the state of heating (increase of specific resistance) of the pair of electrodes 5A and 5B made from tungsten, or the like, cannot be determined accurately, so that the welding strength (adhesive force) cannot be predicted.

Therefore, the present invention is designed to solve the above problem. Accordingly, it is an object of the present invention to provide a method for inspecting the quality of a resistance weld, in which the adhesive force between the twisted wires of the strands as materials to be welded can be predicted on the basis of the inter-tip resistance between electrodes so that the welding quality can be evaluated accurately.

SUMMARY OF THE INVENTION

The present invention concerns a method for inspecting the quality of a resistance weld formed by passing a welding current between a pair of electrodes and through a welding portion of a material to be welded and applying pressure between the electrodes to the welding portion of twisted wires to be joined for thermo-compression bonding of the welding portion to thereby perform resistance welding of the welding portion under pressure applied between the pair of electrodes.

In a first embodiment, the present method comprises the steps of: measuring a welding width of the welding portion; calculating a reference welding height of the welding portion from the measured welding width on the basis of a predetermined reference welding sectional area of the welding portion; passing the welding current between the electrodes and through the welding portion until the height of the welding portion reaches the calculated reference welding height; and inspecting the state of the weld joining the twisted wires on the basis of substantially lowest values of inter-tip resistance of the pair of electrodes in an initial stage of conduction of the welding current.

In the first embodiment of the present method for inspecting the quality of resistance welding, the bottom value of inter-tip resistance in the initial stage of the conduction of a welding current is determined on the basis of the state of the twisted wires and the welding current value. Accordingly, the adhesive force between the twisted wires which have been welded together can be predicted without measuring the temperature rising in the electrodes and the twisted wires after a lowest value is reached, so that the welding quality of the twisted wires that are welded together can be evaluated accurately.

According to a second embodiment of the invention, the present method comprises the steps of: measuring a welding width of the welding portion; calculating a reference welding height of the welding portion from the measured welding width on the basis of a predetermined reference welding sectional area of the welding portion; passing the welding current between the electrodes and through the welding portion until the height of the welding portion reaches the calculated reference welding height; and inspecting the state of the weld joining the twisted wires on the basis of a difference resistance value between a substantially lowest value of inter-tip resistance between the pair of electrodes in an initial stage of conduction of the welding current and the inter-tip resistance value at the time of stop of the current conduction.

In the second embodiment of the present method for inspecting the quality of resistance welding, the difference resistance value in the inter-tip resistance after a lowest value in the initial stage of conduction of the welding current is used as a subject of evaluation of the welding state of the twisted wires. Accordingly, the contact resistance peculiar to the twisted wires is canceled so that the inter-tip resistance which is caused by the temperature rising in the electrodes and the twisted wires, and which has strong correlation with adhesive force, can be predicted. Accordingly, the welding quality of the twisted wires welded with each other can be evaluated accurately.

According to a third embodiment of the invention, the present invention comprises the steps of: measuring a welding width of the welding portion; calculating a reference welding height of the welding portion from the measured welding width on the basis of a predetermined reference welding sectional area of the welding portion; passing the welding current between the electrodes and through the welding portion until the height of the welding portion reaches the calculated reference welding height; and inspecting the state of the weld joining the twisted wires on the basis of an average resistance value from a substantially lowest value of inter-tip resistance of the pair of electrodes in an initial stage of conduction of the welding current to the inter-tip resistance value at the time of stop of the current conduction.

In the third embodiment of the present method for inspecting the quality of resistance welding, the difference resistance value in the inter-tip resistance after a lowest value in the initial stage of conduction of the welding current is used as a subject of evaluation of the welding state of the twisted wires. Accordingly, the contact resistance peculiar to the twisted wires is canceled. Thus, the inter-tip resistance which are caused by the temperature rising in the electrodes and the twisted wires and which has strong correlation with adhesive force can be predicted. Accordingly, the welding quality of the twisted wires welded with each other can be evaluated accurately.

BRIEF DESCRIPTION OF DRAWINGS

FIG. 2(a) is a perspective view showing the strands of a pair of cables to be resistance-welded by a resistance welding apparatus; and, FIG. 2(b) is an explanatory view showing the relation in lamination between a pair of electrodes and the strands of a pair of cables at the time of resistance welding.

FIG. 3(a) is a view showing a state in which strands of the pair of cables have not yet been welded; and, FIG. 3(b) is an explanatory view showing a reference welding sectional area indicating a state in which the strands are welded.

FIG. 5(a) is a graph showing the waveform of the inter-tip resistance in a period from the start to end of the current conduction carried out by the aforementioned resistance welding apparatus, especially showing the position of the lowest value of the resistance in the initial stage of the current conduction; and, FIG. 5(b) is a characteristic graph showing the relationship between the lowest value (mΩ) of the resistance and the adhesive force (kgf) between the wires of the strands.

FIG. 6(a) is a graph showing the waveform of the inter-tip resistance in a period from the start to end of the current conduction carried out by the aforementioned resistance welding apparatus, especially showing the difference resistance value between the lowest value of the resistance and the value of the resistance at the time of stop of the current conduction; and, FIG. 6(b) is a graph showing the relationship between the difference resistance value (mΩ) and the adhesive force (kgf) between the wires of the strands.

FIG. 7(a) is a graph showing the waveform of the inter-tip resistance in a period from the start to end of current conduction carried out by the aforementioned resistance welding apparatus, especially showing the averaged resistance value in a range from the lowest value of the resistance in the initial stage of the current conduction to the value of the resistance at the time of stop of the current conduction; and, FIG. 7(b) is a graph showing the relationship between the averaged resistance value (mΩ) and the adhesive force (kgf) between the wires of the strands.

DESCRIPTION OF THE PREFERRED EMBODIMENTS

The several embodiments of the present invention will be described below with reference to the drawings.

Figure 1:
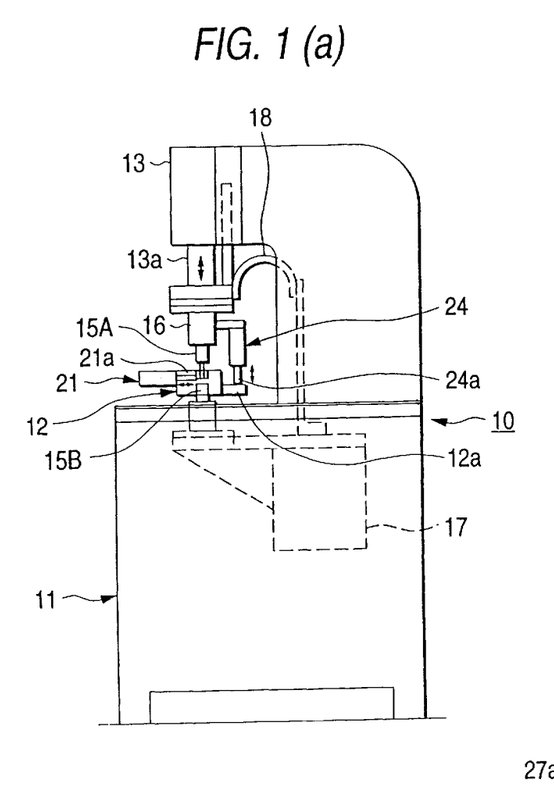
FIG. 1(a) is a side view showing a resistance welding apparatus in a mode for carrying out the present invention.
FIG. 1(b) is a view of a main part of the resistance welding apparatus.
FIG. 1(c) is a view of another main part of the resistance welding apparatus.
Figure 2:
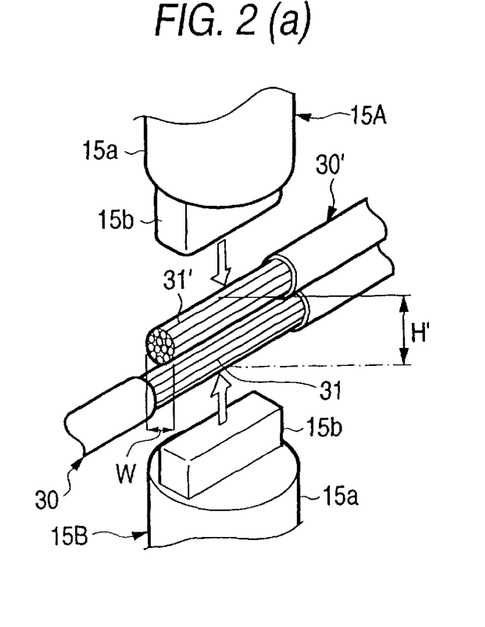

FIG. 1(a) is a side view showing a resistance welding apparatus used in carrying out a method for inspecting the quality of resistance welding in accordance with the present invention; FIG. 1(b) is a configuration view of a main part of the resistance welding apparatus; and, FIG. 1(c) is a configuration view showing another main part of the resistance welding apparatus. FIG. 2(a) is a perspective view showing strands of a pair of cables which are subjected to resistance welding by the resistance welding apparatus and FIG. 2(b) is an explanatory view showing the relation of space between the pair of electrodes and the strands of the pair of cables at the time of the resistance welding.

The resistance welding apparatus 10 shown in FIG. 1(a) is an apparatus of an AC thyristor system (a system in which thyristors are used as electric source switches for performing welding current regulation continuously by changing the firing phase of the thyristors. The resistance welding apparatus 10 serves to perform resistance welding on strands 31 and 31' composed of twisted copper wires from a pair of cables 30 and 30' which are placed one on the other. The resistance welding apparatus 10 has a box-like apparatus body 11 which is substantially U-shaped in side view. A cable-setting jig 12 is disposed in the center of the apparatus body 11. An air cylinder (drive means) 13 is attached to the upper front of the apparatus body 11. A pair of upper and lower electrodes 15A and 15B, which serve to pass a welding current therebetween and through a welding portion of the strands 31 and 31', also serve to apply a predetermined amount of pressure to the welding portion. The electrodes 15A and 15B are provided below the cable-setting jig 12 and below the air cylinder 13, respectively. Each of the electrodes (electrode tips) 15A and 15B is constituted by a columnar chromium-copper body 15a and a rectangular tungsten tip 15b.

The upper electrode 15A is connected to a piston rod 13a of the air cylinder 13 through an electrode holder 16 so as to move vertically. Further, the upper electrode 15A is also connected, through an ounce copper plate 18, to a welding transformer (electric source) 17 which serves to supply a welding current. On the other hand, the lower electrode 15B is fixed to the center portion of the apparatus body 11 and connected to the welding transformer 17. Further, a welding timer 19 which controls the current-conduction time of the welding current is connected to the welding transformer 17. A sequencer (interface) 20 having a sequence control circuit not shown, or the like, is connected to the welding timer 19. On the basis of conduction-start and conduction-end signals obtained from the sequencer 20, an electromagnetic valve 14 of the air cylinder 13 is opened/closed and the welding timer 19 is controlled (to start/end the current conduction). The pressure applied between the pair of electrodes 15A and 15B by the piston rod 13a of the air cylinder 13 is set to be, for example, in a range of from about 100 to about 200 kgf. Further, in order to obtain a low voltage (for example, about 2 V) and a large current (for example, in a range of from 4000 to 6000 A), the welding transformer 17 has a primary winding, a secondary winding, or the like, which are not shown.

Figure 3:
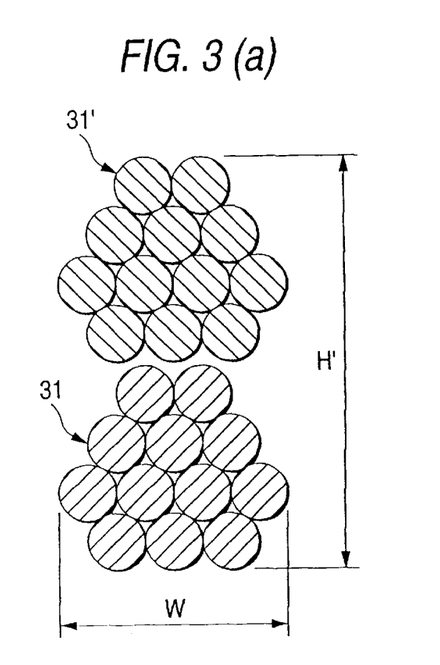

As shown in FIG. 1(a), a width displacement sensor (width measurement means) 21 for measuring the welding width W of the welding portion of the strands 31 and 31' is provided in the cable-setting jig 12. As shown in FIG. 1(b) and with reference to FIGS. 3(a) and 3(b), an arithmetic operation portion (arithmetic operation means) 22 having an arithmetic operation means (not shown), or the like, is connected to the sequencer 20 for reversely calculating (S÷W=H) to obtain the reference welding height H of the welding portion from a predetermined reference welding sectional area S of the welding portion on the basis of the welding width W of the welding portion of the strands 31 and 31' measured by the width displacement sensor 21. Also, a display unit (display means) 23 is provided in the arithmetic operation portion 22 for displaying the current-conduction time from start to end of the conduction of the welding current, or the like. Furthermore, a height displacement sensor (height detection means) 24 is provided in the electrode holder 16 for making detection as to whether the height H' of the welding portion has reached the reference welding height H or not so that the welding timer 19 is controlled by the sequencer 20 to stop the conduction of the welding current when the reference welding height H of the welding portion is detected by the height displacement sensor 24.

The width displacement sensor 21 has a probe 21a which moves horizontally so that the welding width W of the welding portion of the strands 31 and 31' is measured on the basis of the moving distance of the probe 21a. Further, the display unit 23 has a liquid crystal panel not shown, or the like, so that information of the current-conduction time from the start to end of conduction of the welding current, or the like, is displayed on the liquid crystal panel. Further, the height displacement sensor 24 has a probe 24a which moves vertically and which comes into contact with a reference plate portion 12a of the cable-setting jig 12 so that whether the height H' of the welding portion of the strands 31 and 31' has reached the reference welding height H or not is detected on the basis of the moving distance of the probe 24a.

As shown in FIG. 1(a), an inter-tip resistance arithmetic operation portion (inter-tip resistance arithmetic operation means) 25 for calculating inter-tip resistance between a pair of electrodes 15A and 15B in a period from the start to end of conduction of the welding current in strands 31 and 31' is provided between the pair of electrodes 15A and 15B and an ounce copper plate 18. The inter-tip resistance arithmetic operation portion 25 is connected to a current detection portion 26 for the ounce copper plate 18 and to inter-tip voltage detection portions 27a and 27b for the pair of electrodes 15A and 15B so that the inter-tip resistance is calculated on the basis of the inter-tip voltage and current values between the pair of electrodes 15A and 15B under current conduction by means of time sampling.

Figure 4:
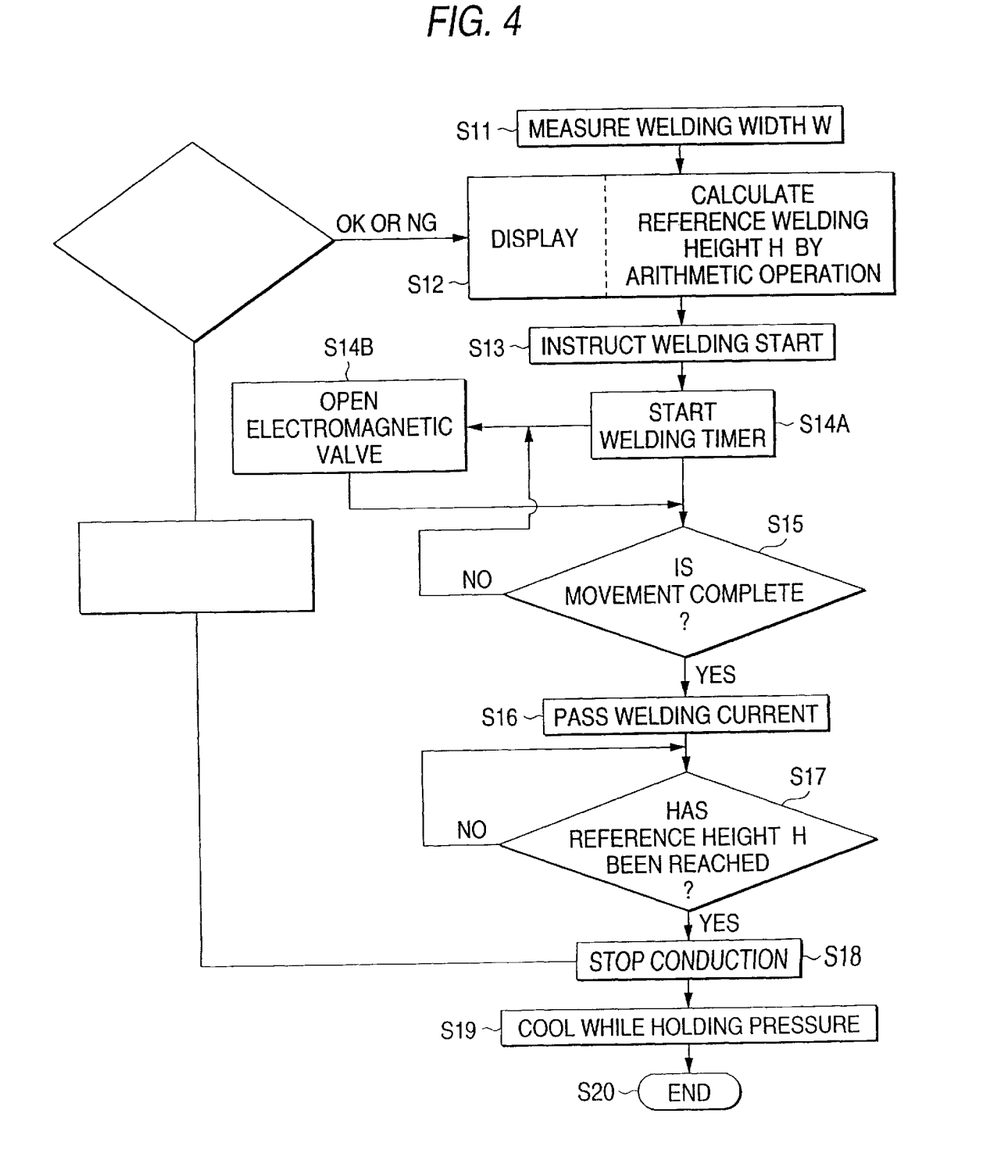
FIG. 4 is a flow chart for the resistance welding of the strands of the pair of cables by the resistance welding apparatus.

The step of performing resistance welding on the strands 31 and 31' composed of twisted copper wires of the pair of cables 30 and 30' which are placed one on the other, by use of the AC thyristor system resistance welding apparatus 10, will be described below with reference to a flow chart shown in FIG. 4. The description will be made by way of example about the case where, for example, the conduction of the welding current was performed until the height H' of the welding portion of the strands 31 and 31' reached the reference welding height H, for example, in the condition in which the welding width W of the welding portion of the strands 31 and 31' of the pair of cables 30 and 30' was 25 mm, the reference welding sectional area S was 7.5 mm$^2$, the reference welding height H was 3.0 mm, the height H' of the welding portion before welding was 5.0 mm, the pressure applied to the pair of electrodes 15a and 15b was 150 kgf, and the welding current was 4000 A.

As shown in FIG. 2(b), after the exposed strands 31 and 31' of the pair of cables 30 and 30' are set in the cable-setting jig 12 so as to be placed one on the other, the welding width W of the welding portion of the strands 31 and 31' is measured (step S11). When the reference welding height H of the welding portion is calculated by the arithmetic operation portion 22 on the basis of the reference welding sectional area S of the welding portion of the strands 31 and 31' predetermined by the measured welding width W (step S12), the sequencer 20 issues an instruction to input the welding start (step S13). As a result, the welding timer 19 starts (step S14A). At the same time, the electromagnetic valve 14 connected to a compression air source (not shown) is opened, so that the upper electrode 15A is moved down (step 14B). After completion of initial pressure application to the strands 31 and 31' between the pair of electrodes 15A and 15B (step S15), a welding current is passed between the pair of electrodes 15A and 15B alternately upward and downward by the welding transformer 17 (step S16). Resistance heating caused by the conduction of the welding current is utilized so that the strands 31 and 31' are fused by therno-compression bonding (or diffusion bonding) by using the resistance heating.

When the height displacement sensor 24 detects the fact that the height H' of the welding portion of the strands 31 and 31' has reached the reference welding height H (H'=H) (step S17), the sequencer 20 stops the conduction of the welding current through the welding timer 19 (step S18). That is, the welding current is passed continuously to perform resistance welding of the strands 31 and 31' until the height displacement sensor 24 detects the fact that the height H' of the welding portion of the strands 31 and 31' has reached the reference welding height H. Then, cooling is performed while the state of pressure between the pair of electrodes 15A and 15B is held for a predetermined time (step S19). Then, the state of pressure is canceled to terminate the resistance welding (step S20).

Figure 5:
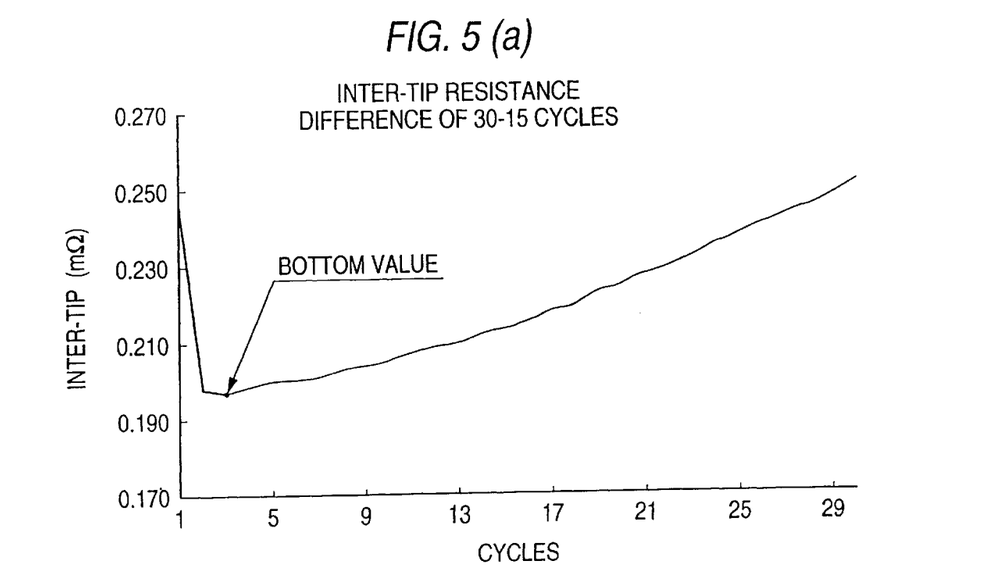

Then, in the step S18 in which the sequencer 20 stops the conduction of the welding current in the strands 31 and 31' through the welding timer 19, the inter-tip resistance waveform in the period from the start to end of conduction of the welding current in the strands 31 and 31' as calculated by the inter-tip resistance arithmetic operation portion 25 is displayed on the display unit 23 as shown in FIG. 5(a). In detail, the waveform of the inter-tip resistance between the pair of electrodes 15A and 15B in a period from the start to end of conduction of the welding current until the height H' of the welding portion of the strands 31 and 31' reaches the reference welding height H calculated on the basis of the reference welding sectional area S, and the lowest value of the inter-tip resistance in the initial stage of current conduction are indicated on the display unit 23. Because the lowest value of the inter-tip resistance in the initial stage of current conduction is determined on the basis of the state of the strands 31 and 31' and the current value flowing between the pair of electrodes 15A and 15B, the adhesive force between the strands 31 and 31' welded with each other can be predicted without knowing the temperature rising in the pair of electrodes 5A and 5B and in the strands 31 and 31' after the lowest value. Accordingly, the welding quality of the strands 31 and 31' can be evaluated accurately. That is, it is found that, when the lowest value of inter-tip resistance in the initial stage of conduction of the welding current is in the range A shown in FIG. 5(b), the welding quality is so good that the adhesive force between the strands 31 and 31' is not lower than the standard value and that, when the bottom value is out of the range A, the welding quality is bad because of shortage or excess of thermal contact-bonding (shortage or excess of welding).

In the case where the welding portion of the strands 31 and 31' resistance-welded with each other is good, the gap between the wires is eliminated so that the peripheries of the wires are closely connected and welded to each other (the percentage of the gap between the strands 31 and 31' is substantially zero). Accordingly, the adhesive force between the wires is stable regardless of the state of alignment of the strands 31 and 31'.

Figure 6:
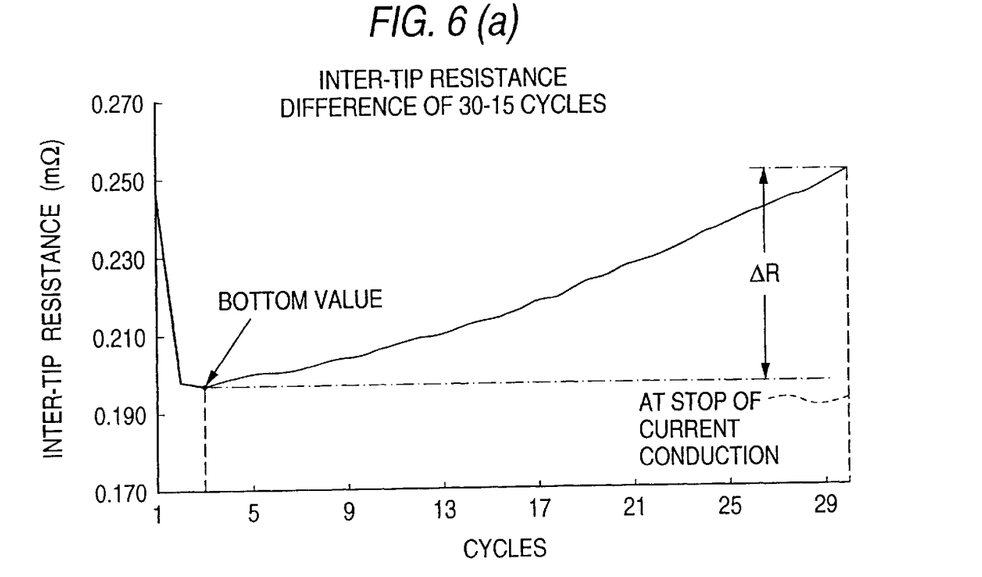
Figure 7:
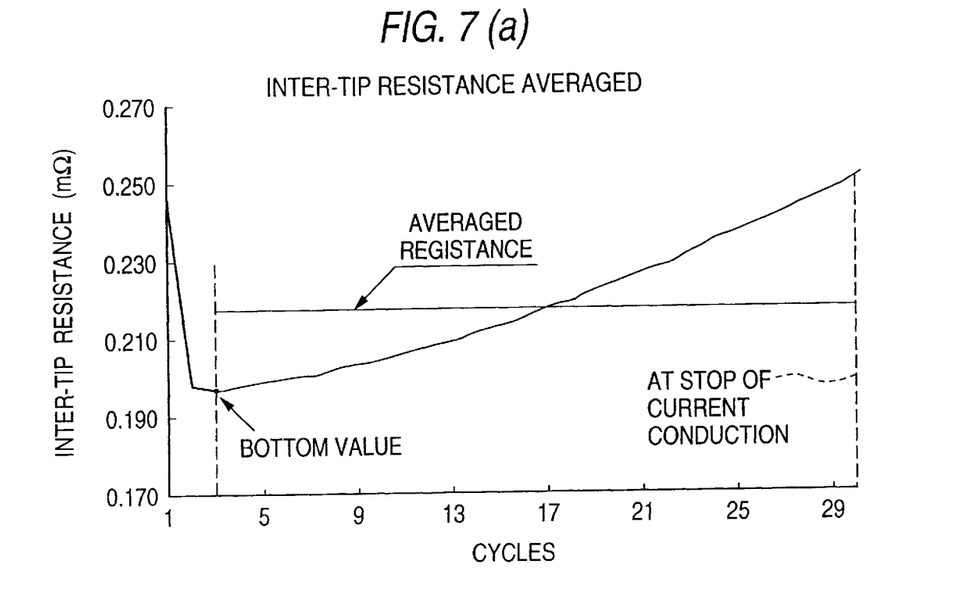

Although FIG. 5(a) shows the case where the welding quality of the strands 31 and 31' is inspected on the basis of the bottom value of the inter-tip resistance in the initial stage of current conduction, the invention may be applied also to a case where the welding quality of the strands 31 and 31' is inspected on the basis of the difference resistance value $\Delta R$ between the bottom value of the inter-tip resistance in the initial stage of conduction of the welding current and the value of inter-tip resistance at the time of stop of the current conduction as shown in FIG. 6(a), or to a case where the welding quality of the strands 31 and 31' is inspected on the basis of the averaged resistance value in a range from the lowest value of the inter-tip resistance in the initial stage of conduction of the welding current to the value of the inter-tip resistance at the time of stop of the current conduction as shown in FIG. 7(a). That is, when the difference resistance value $\Delta R$ of the inter-tip resistance after the bottom value in the initial stage of conduction of the welding current is used as a subject of evaluation of the welding state of the strands 31 and 31' as shown in FIG. 6(a), the contact resistance peculiar to the strands 31 and 31' can be canceled. Accordingly, it is possible to predict the inter-tip resistance which is caused by the temperature rising in the pair of electrodes 15A and 15B and in the strands 31 and 31' and which has strong correlation with the adhesive force. Accordingly, it is found that, when the difference resistance value $\Delta R$ is in the range B shown in FIG. 6(b), the welding quality is so good that the adhesive force between the strands 31 and 31' is not lower than the standard value and that, when the difference resistance value $\Delta R$ is out of the range B, the welding quality is bad because of shortage or excess of the welding. Accordingly, the welding quality of the strands 31 and 31' can be evaluated accurately.

Further, when the averaged resistance value in a range from the bottom value of the inter-tip resistance in the initial stage of conduction of the welding current to the value of the inter-tip resistance at the time of stop of the current conduction is used as a subject of evaluation of the welding state of the strands 31 and 31' as shown in FIG. 7(a), the contact resistance peculiar to the strands 31 and 31' can be canceled. Accordingly, it is possible to predict the inter-tip resistance which is caused by the temperature rising in the pair of electrodes 15A and 15B and in the strands 31 and 31' and which has strong correlation with the adhesive force. Accordingly, it is found that, when the averaged resistance value is the range C shown in FIG. 7(b), the welding quality is good so that the adhesive force between the strands 31 and 31' is not lower than the standard value and that, when the averaged resistance value is out of the range C, the welding quality is bad because of shortage or excess of welding. Accordingly, the welding quality of the strands 31 and 31' can be evaluated accurately.

The reason why the initial value of the waveform change in the inter-tip resistance between the pair of electrodes 15A and 15B in a period from the start to end of conduction of the welding current as shown in FIGS. 5(a), 6(a) and 7(a) is slightly high, is in that the tip diameter of a tungsten tip 5b in each of the electrodes 15A and 15B is small enough to obtain a satisfactory welding current density. Then, after the resistance value falls down, the resistance value rises gradually with the advance of melting of the strands 31 and 31' so that a difference occurs in the resistance value. Accordingly, if the lowest value of the inter-tip resistance in the initial stage of current conduction, the difference resistance value ΔR and the averaged resistance value after the lowest value are measured, the welding quality in the strands 31 and 31' can be inspected accurately.

As described above, according to the invention, the bottom value of inter-tip resistance in the initial stage of the conduction of a welding current is determined on the basis of the state of the twisted wires and the current value. Accordingly, the adhesive force between the twisted wires which have been welded with each other can be predicted without inspecting the temperature rising in the electrodes and the twisted wires after the bottom value, so that the welding quality of the twisted wires welded with each other can be evaluated accurately.

According to another feature of the invention, the difference resistance value in the inter-tip resistance after the bottom value in the initial stage of conduction of the welding current is used as a subject of evaluation of the welding state of the twisted wires. Accordingly, the contact resistance peculiar to the twisted wires can be canceled so that the inter-tip resistance which are caused by the temperature rising in the electrodes and the twisted wires and which has strong correlation with adhesive force can be predicted. Accordingly, the welding quality of the twisted wires welded with each other can be evaluated accurately.

According to a further feature of the invention, the difference resistance value in the inter-tip resistance after the bottom value in the initial stage of conduction of the welding current is used as a subject of evaluation of the welding state of the twisted wires. Accordingly, the contact resistance peculiar to the twisted wires can be canceled so that the inter-tip resistance which are caused by the temperature rising in the electrodes and the twisted wires and which has strong correlation with adhesive force can be predicted. Accordingly, the welding quality of the twisted wires welded with each other can be evaluated accurately.

While the present invention has been described with respect to one or more referred embodiments, it is not limited thereto and the full scope of the invention is as defined in the appended claims, interpreted in accordance with applicable law.

What is claimed is:

1. A method for inspecting the quality of a resistance weld formed by passing a welding current between a pair of electrodes and through a welding portion of a material to be welded and applying pressure between said pair of electrodes to said welding portion for thermo-compression bonding of said welding portion comprising the steps of:
    measuring a welding width of said welding portion;
    calculating a reference welding height of said welding portion from the measured welding width on the basis of a predetermined reference welding sectional area of said welding portion;
    passing the welding current between said electrodes and through said welding portion until the height of said welding portion reaches said calculated reference welding height; and
    inspecting the quality of welding of the welding portion on the basis of a lowest value of inter-tip resistance of said pair of electrodes in an initial stage of conduction of the welding current.

2. The method of claim 1 further comprising stopping the conduction of welding current when the height of said welding portion reaches said calculated reference welding height.

3. The method of claim 1 wherein said inspecting step further comprises detecting a conduction current value, detecting an inter-tip voltage value and calculating inter-tip resistance between said electrodes based on detected voltage and current values during conduction of welding current.

4. A method for inspecting the quality of a resistance weld formed by passing a welding current between a pair of electrodes and through a welding portion of a material to be welded and applying pressure between said pair of electrodes to said welding portion for thermo-compression bonding of said welding portion comprising the steps of:
    measuring a welding width of said welding portion;
    calculating a reference welding height of said welding portion from the measured welding width on the basis of a predetermined reference welding sectional area of said welding portion;
    passing the welding current between said electrodes and through said welding portion until the height of said welding portion reaches said calculated reference welding height; and
    inspecting the quality of welding of the welding portion on the basis of a difference resistance value between a lowest value of inter-tip resistance of said pair of electrodes in an initial stage of conduction of the welding current and the inter-tip resistance value at the time that the current conduction stops.

5. The method of claim 4 further comprising stopping the conduction of welding current when the height of said welding portion reaches said calculated reference welding height.

6. The method of claim 4 wherein said inspecting step further comprises detecting a conduction current value, detecting an inter-tip voltage value and calculating inter-tip resistance between said electrodes based on detected voltage and current values during conduction of welding current.

7. A method for inspecting the quality of a resistance weld formed by passing a welding current between a pair of electrodes and through a welding portion of a material to be welded and applying pressure between said pair of electrodes and to said welding portion for thermo-compression bonding of said welding portion comprising the steps of:
    measuring a welding width of said welding portion;
    calculating a reference welding height of said welding portion from the measured welding width on the basis of a predetermined reference welding sectional area of said welding portion;
    passing the welding current between said electrodes and through said welding portion until the height of said welding portion reaches said calculated reference welding height; and
    inspecting the quality of welding of the welding portion on the basis of an average resistance value from a lowest value of inter-tip resistance of said pair of electrodes in an initial stage of conduction of the welding current to the inter-tip resistance value at the time that the current conduction stops.

8. The method of claim 7 further comprising stopping the conduction of welding current when the height of said welding portion reaches said calculated reference welding height.

9. The method of claim 7 wherein said inspecting step further comprises detecting a conduction current value, detecting an inter-tip voltage value and calculating inter-tip resistance between said electrodes based on detected voltage and current values during conduction of welding current.

10. Apparatus for forming a resistance weld comprising: means for passing a welding current between a pair of electrodes and through a welding portion of a material to be welded and applying pressure between said pair of electrodes to said welding portion for thermo-compression bonding of said welding portion;

width measuring means for measuring a welding width of said welding portion;

means for calculating a reference welding height of said welding portion from the measured welding width on the basis of a predetermined reference welding sectional area of said welding portion;

height determining means for determining when the height of said welding portion reaches said calculated reference welding height; and means for inspecting the quality of welding of the welding portion on the basis of a lowest identified value of inter-tip resistance of said pair of electrodes in an initial stage of conduction of the welding current.

11. The apparatus of claim 10 wherein said means for calculating comprises a means for calculating H=S/W, where H is the welding height, S is the reference welding sectional area and W is the welding width measured by said width measuring means.

12. The apparatus of claim 10 further comprising a sequencer means for stopping the conduction of welding current when said height determining means determines that the height of said welding portion reaches said calculated reference welding height.

13. The apparatus of claim 10 wherein said means for inspecting comprises a means for detecting a conduction current value, means for detecting an inter-tip voltage value and means for calculating inter-tip resistance between said electrodes based on detected voltage and current values during conduction of welding current.

14. Apparatus for forming a resistance weld comprising: means for passing a welding current between a pair of electrodes and through a welding portion of a material to be welded and applying pressure between said pair of electrodes to said welding portion for thermo-compression bonding of said welding portion;

means for measuring a welding width of said welding portion;

means for calculating a reference welding height of said welding portion from the measured welding width on the basis of a predetermined reference welding sectional area of said welding portion;

means for determining when the height of said welding portion reaches said calculated reference welding height; and means for inspecting the quality of welding of the welding portion on the basis of a difference resistance value between a bottom value of inter-tip resistance of said pair of electrodes in an initial stage of conduction of the welding current and the inter-tip resistance value at the time that the current conduction stops.

15. The apparatus of claim 14 wherein said means for calculating comprises a means for calculating H=S/W, where H is the welding height, S is the reference welding sectional area and W is the welding width measured by said width measuring means.

16. The apparatus of claim 14 further comprising a sequencer means for stopping the conduction of welding current when said height determining means determines that the height of said welding portion reaches said calculated reference welding height.

17. The apparatus of claim 14 wherein said means for inspecting comprises a means for detecting a conduction current value, means for detecting an inter-tip voltage value and means for calculating inter-tip resistance between said electrodes based on detected voltage and current values during conduction of welding current.

18. Apparatus for forming a resistance weld comprising: means for passing a welding current between a pair of electrodes and through a welding portion of a material to be welded and applying pressure between said pair of electrodes to said welding portion for thermo-compression bonding of said welding portion;

means for measuring a welding width of said welding portion;

means for calculating a reference welding height of said welding portion from the measured welding width on the basis of a predetermined reference welding sectional area of said welding portion;

means for determining when the height of said welding portion reaches said calculated reference welding height; and means for inspecting the quality of welding of the welding portion on the basis of an average resistance value from a lowest value of inter-tip resistance of said pair of electrodes in an initial stage of conduction of the welding current to the inter-tip resistance value at the time that the current conduction stops.

19. The apparatus of claim 18 wherein said means for calculating comprises a means for calculating H=S/W, where H is the welding height, S is the reference welding sectional area and W is the welding width measured by said width measuring means.

20. The apparatus of claim 18 further comprising a sequencer means for stopping the conduction of welding current when said height determining means determines that the height of said welding portion reaches said calculated reference welding height.

21. The apparatus of claim 18 wherein said means for inspecting comprises a means for detecting a conduction current value, means for detecting an inter-tip voltage value and means for calculating inter-tip resistance between said electrodes based on detected voltage and current values during conduction of welding current.

* * * * *